United States Patent
Shepherd

(10) Patent No.: US 9,758,413 B1
(45) Date of Patent: Sep. 12, 2017

(54) PROCESS AND SYSTEM FOR REMOVING POLLUTANTS FROM CONTAMINATED WATER AND FOR THE PRODUCTION OF AN ALGAL BIOMASS

(71) Applicant: Samuel L. Shepherd, Houston, TX (US)

(72) Inventor: Samuel L. Shepherd, Houston, TX (US)

(73) Assignee: MISSING LINK TECHNOLOGY, LLC, Cypress, TX (US)

( * ) Notice: Subject to any disclaimer, the term of this patent is extended or adjusted under 35 U.S.C. 154(b) by 268 days.

(21) Appl. No.: 13/919,202

(22) Filed: Jun. 17, 2013

Related U.S. Application Data

(60) Provisional application No. 61/662,628, filed on Jun. 21, 2012.

(51) Int. Cl.
*C02F 3/32* (2006.01)
(52) U.S. Cl.
CPC .................................. *C02F 3/322* (2013.01)
(58) Field of Classification Search
CPC ...... Y02W 10/12; C12M 21/02; C12M 21/04; C12M 23/58; C12M 29/06; C12M 33/14; C12M 43/06; C02F 2305/06; C02F 3/32; C02F 3/322; Y02E 50/10; Y02E 50/801; B01D 2257/504; B01D 53/84; C12R 1/89
USPC .............................................. 210/602, 221.2
See application file for complete search history.

(56) References Cited

U.S. PATENT DOCUMENTS

| | | | |
|---|---|---|---|
| 4,069,149 A | 1/1978 | Jackson | |
| 4,286,066 A | 8/1981 | Butler et al. | |
| 5,688,674 A | 11/1997 | Choi et al. | |
| 6,599,735 B1 | 7/2003 | Bartok et al. | |
| 2009/0130706 A1* | 5/2009 | Berzin et al. | ........................ 435/41 |
| 2009/0321349 A1* | 12/2009 | Offerman et al. | ............ 210/603 |
| 2010/0255458 A1* | 10/2010 | Kinkaid | ........................... 435/3 |

FOREIGN PATENT DOCUMENTS

CN  102161550  *  8/2011

OTHER PUBLICATIONS

Zhiwu, English Machine Tranlation CN 102161550, Aug. 2011, pp. 1-7.*

* cited by examiner

*Primary Examiner* — Claire Norris
(74) *Attorney, Agent, or Firm* — Egbert Law Offices, PLLC

(57) ABSTRACT

A process for treating contaminated water has the steps of filtering the contaminated water through a filter so as to produce a filtrate therefrom, introducing nutrients and a biomass into an interior volume of the of a light reactor, passing the filtrate into the light reactor, reacting light with the nutrients and the biomass so as to produce a light-reacted biomass, transferring the light-reacted biomass to a dark reactor, reacting the transferred light-reacted biomass with carbon dioxide in the dark reactor, and filtering the reacted biomass from the dark reactor so as to remove the biomass therefrom. The nutrients in the biomass are continuously stirred within the light reactor in a toroidal circulation pattern.

12 Claims, 3 Drawing Sheets

PROCESS AND SYSTEM FOR REMOVING POLLUTANTS FROM CONTAMINATED WATER AND FOR THE PRODUCTION OF AN ALGAL BIOMASS

CROSS-REFERENCE TO RELATED APPLICATIONS

The present application claims priority from U.S. Provisional Patent Application Ser. No. 61/662,628, filed on Jun. 21, 2012, and entitled "Process and System for Removing Pollutants from Contaminated Water and for the Production of an Algal Biomass".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the treatment of contaminated water. More particularly, the present invention relates to the treatment of contaminated water through the use of membrane biological reactors. Additionally, the present invention relates to a process for treating contaminated water whereby the growth of phototrophic organisms is used to remove the nitrogen and phosphorus content from the contaminated water.

2. Description of Related Art Including Information Disclosed Under 37 CFR 1.97 and 37 CFR 1.98

Contaminated water is often treated through a wide variety of processes. Often, the contaminated water is filtered and treated so that a suitable treated water is passed from the treatment system. Unfortunately, the treated water often has a very high nitrogen and phosphorus content. As such, it is necessary to employ additional systems in a relatively costly and inefficient manner so as to remove such nitrogen and phosphorus content from the treated water.

Membrane biological reactors are known in the past. The membrane biological reactor is a combination of a membrane process, such as microfiltration or ultrafiltration, along with a suspended growth bioreactor. Such membrane biological reactors are widely used in municipal and industrial wastewater treatment. When used with domestic wastewater treatment, membrane biological reactor processes produce an effluent of a high quality suitable for being discharged to coastal, surface or brackish waterways or to be reclaimed for urban irrigation. Other advantages of membrane biological reactors over conventional processes include a small footprint, an easy retrofit and an upgradability of old wastewater treatment plants. It is possible to operate membrane biological reactor processes at higher mixed liquor suspended solids concentrations compared to conventional settlement separation systems. This reduces the reactor volume to achieve the same loading rate.

Two types of membrane biological reactor configurations exist. These are the internal/submerged systems and the external/sidestream systems. In the internal/submerged systems, the membranes are immersed in and integral to the biological reactor. In the external/sidestream systems, the membranes are a separate unit process requiring an intermediate pumping step.

Recent technical innovations and significant membrane cost reductions have pushed membrane biological reactors to become an established process option to treat wastewaters. As a result, the membrane biological reactor process has now become an attractive option for the treatment and reuse of industrial and municipal wastewaters, as evidenced by their constantly rising numbers and capacities.

Unfortunately, such membrane biological reactors are unable to significantly reduce the nitrogen and phosphorus content of the filtrate of the system. As such, additional steps are necessary so as to remove the nitrogen and phosphorus content to a level suitable for making the filtered water output of a suitably potable nature.

Algae fuel is a biofuel which is derived from algae. During photosynthesis, algae and other synthetic organisms capture carbon dioxide and sunlight and convert it into oxygen and biomass. Up to 99% of the carbon dioxide in solution can be converted in large scale open-pond systems. Several companies and government agencies are funding efforts to reduce capital and operating costs and make algae oil production commercially viable. The production of biofuels from algae does not reduce atmospheric carbon dioxide, because any carbon dioxide taken out the atmosphere by the algae is returned when the biofuels are burned. They do eliminate the introduction of new carbon dioxide by displacing fossil carbon fuels.

High oil prices and competing demands between foods and other biofuel sources and the world food crisis have ignited interest in algaculture (farming algae) so as to make vegetable oil, biodesiel, bioethanol, biogasoline, biomethanol, biobutanol and other biofuels by using land that is not suitable for agriculture. Among algal fuel's attractive characteristics is that it does not affect fresh water resources, can be produced using ocean and wastewater, and is biodegradable and relatively harmless to the environment if spilled. Algae can yield over thirty times more energy per unit area than other second-generation biofuel crops. The United States Department of Energy estimates that if algae replaced all petroleum fuel in the United States, it would require 15,000 square miles of land. This is less than one-seventh of the area of corn harvested in the United States.

Algae can produce up to 300 times more oil per acre than conventional crops, such as rapeseed, palms or soy beans. Since algae has a harvesting cycle of between one and ten days, it permits several harvests in a very short time period. Algae can be grown on land that is not suitable for other crops. This minimizes the issue of taking any pieces of land from the cultivation of food crops.

Most companies that are pursuing algae as a source of biofuels are pumping nutrient-laden waters through plastic tubes that are exposed to sunlight. Generally, the use of a photobioreactor is more difficult than an open pond and more costly. Another obstacle preventing widespread mass production of algae for biofuel production has been the equipment and structures needed to begin growing algae in large quantities. In closed loop systems, there is no problem of contamination by other organisms blown in by the air.

Algal market models indicate the development of fuels from algae will follow the pattern of crude oil from specialty to commodity chemical models of the 1920's and 1930's. The distinct difference is that during this period of time, the markets were required to be created, whereas today, the markets already exist.

Although "algal oil to transportation fuels" has been the driving force to date, only the co-products of algae oil production will bring economic stability to the market. As in the oil refining business, transportation fuel production alone is incapable of supporting the current cost of producing fuels due to the imbalance in supply and demand.

Each pound of algae produces about 0.4 pounds of algae protein meal, 0.2 pounds of carbohydrates, and 0.3 pounds of algae oil. Algae meal can be a major protein supplement used in aquatic, livestock and poultry feeds. As such, herd and flock numbers are major influences on algae meal consumption and prices. Algae products are and will be used to manufacture fuels, fuel feedstocks, foodstuffs, food products, and ethanol. Technical uses include adhesives, cleansing materials, polyesters, inks, coatings, polymers, detergents, quaternary salts, pharmaceuticals, chemical and biological feedstocks and other textiles.

The current demand for algal products is severely outpaced by the supply. It is not anticipated that supply will be capable of meeting demand for at least 15-20 years. Therefore, algal products will follow the classical specialty chemical models from current to at least ten years out. The transition from specialty to commodity will occur after that, first being noticed by variable market pricing swings from high to low.

As long as the demand outpaces supply, algal producers will continually pursue the "highest value" markets. These markets will consist of pharmaceuticals, plastics, nutraceuticals and specialty chemical feedstocks. As supply and demand come into balance, algal products will begin leaking over into the commodity models. Only then will the algal products be used in the transportation fuel markets. Once algae biomass becomes a commodity in the market, futures and options markets will develop. As such, there is a need for utilizing algae production so as to maximize the fuel output and to utilize the various components of the algae in an optimal and efficient manner.

In the past, various patents have been issued in the field of microorganisms growth and relating to processing bio-harvests. For example, U.S. Pat. No. 6,599,735, issued on Jul. 29, 2003 to Bartok et al., describes a fermentation assembly comprising a vessel for culturing living cells, at least two storage flasks in fluid communication with the vessel for supply of liquids and a first transport means for transferring the liquids from the storage flasks to the vessel, individual appliances operably connected to the transport means for monitoring the supply of the contents of the storage flasks to the vessel, a harvest flask in fluid communication with the vessel and a second transport means for transferring the fermentation broth from the vessel to the harvest flask, and a device operably connected to the first transport means for controlling and maintaining a constant dilution rate in the vessel with varying rates of individual supply of liquid from the storage flasks to the vessel.

U.S. Pat. No. 5,688,674, issued on Nov. 18, 1997 to Choi et al., describes a metabolite, e.g., ethanol, that is continuously produced from low cost carbohydrate substrates by a process which comprises pulverizing the carbohydrate substrate, liquefying and saccharifying the pulverized substrate, continuously fermenting the lique-saccharified substrate in a fermentor equipped with a moving filter, in the presence of flocculent biological cells maintained at a concentration ranging from 90 to 160 grams/liter by using the moving filter and a culture medium to produce a fermentation product mixture, and recovering the desired metabolite from the fermentation product mixture.

U.S. Pat. No. 4,069,149, issued on Jan. 17, 1978 to Jackson, describes a deep-tank reactor utilized for fermentation of waste liquid or other liquid in a biological reaction resulting in a solid cellular material. The resulting solid material, which is in suspension, is initially separated from the bulk of the liquid by a gaseous flotation process, using the dissolved gas in the liquid as the source of gaseous bubbles for flotation purposes.

U.S. Pat. No. 4,286,066, issued on Aug. 25, 1981 to Butler et al., describes an apparatus for continuously fermenting a moist particulate feed and distilling the fermentation product where a pressure-locked auger forces a moist particulate feed from a hopper into a fermentation tank. Liquor is removed from the tank, and solids are separated therefrom, to produce a beer which is distilled in a distillation column. A combustion engine powers the auger and the means for separating solids, and the engine exhaust surrounds an inlet section of said auger to help heat the pressurized feed therein to produce fermentable sugar within the auger. The auger includes a section passing to the tank in heat exchange relation to the distillation column to provide heat for distillation. The column is a multistage column angled to face the sun and has an upper glass plate to allow solar radiation to enter and penetrate between the foraminous plates of the column.

It is an object of the present invention to provide a process whereby contaminated water can be effectively treated so as to remove COD, BOD, TSS, along with nitrogen and phosphorus.

It is still another object of the present invention to provide a process whereby the filtrate from the membrane biological reactors can be utilized for supplying nitrogen and oxygen to a High Rate Algal Growth system (HRAG).

It is still a further object of the present invention to provide a system for the treatment of contaminated water whereby the output of the process is potable water.

It is still another object of the present invention to provide a system for the treatment of contaminated water which utilizes both continuous stirred tank reactors and plug flow reactors.

It is still a further object of the present invention to provide a process for the treatment of contaminated water that achieves a growth rate of algae exceeding 120 grams/m$^2$/day.

It is still a further object of the present invention to provide a process for the treatment of contaminated water that optimizes light energy usage.

It is still a further object of the present invention to provide a system for the treatment of contaminated water which optimizes the growth of algae through a combination of "light" and "dark" reactions in a commercially scalable configuration.

It is still a further object of the present invention to provide a process for the treatment of contaminated water that maximizes and controls the usage of carbon dioxide as a feedstock for the reaction.

It is still another object of the present invention to provide a process for the treatment of contaminated water that minimizes the footprint required for the treatment process.

These and other objects and advantages of the present invention will become apparent from a reading of the attached specification and appended claims.

BRIEF SUMMARY OF THE INVENTION

The present invention is a system for treating contaminated water that comprises a filter having an inlet and an outlet such that contaminated water passes into the inlet of the filter and the filtrate passes through the outlet of the filter, and a high rate algal growth system having an interior volume. The high rate algal growth system receives the filtrate from the filter and reacts the filtrate through a reaction process such that an algal biomass and water are passed through an outlet thereof. The high rate algal growth system includes a light reactor having an interior volume. The light reactor is exposed to light. This light reactor has an inlet in communication with the outlet of the filter and an outlet. The high rate algal growth system also has a dark reactor having an inlet connected to the outlet of the light reactor. The dark reactor retains the microorganisms in a dark condition. The dark reactor has an outlet for the grown microorganisms.

In the system of the present invention, another filter can be associated with the outlet of the dark reactor. This filter serves to remove the algal biomass therefrom. The filter has a filtrate outlet that allows the filtered water to pass therefrom.

The filter is a membrane biological reactor suitable for reducing the levels of BOD, COD and TSS. The membrane biological reactor can also serve to produce a biogas therefrom. The biogas can include carbon dioxide that can be utilized in communication with the high rate algal growth system.

The light reactor has a stirring mechanism therein. The stirring mechanism serves to continuously stir the microorganisms in the light reactor. The stirring mechanism can be an air bubbler cooperative with the interior volume of the light reactor. The stirring mechanism can also be a liquid flow through the interior volume of the light reactor. Typically, a nozzle directed to an angle relative to a wall of the reactor can flow liquid or air bubbles so as to create the circulation pattern. This stirring mechanism causes a toroidal circulation pattern of the microorganisms within the interior volume of the light reactor. This circulation pattern is a bottom-to-top circulation pattern of the microorganisms in this interior volume of the light reactor. The outlet of the light reactor can be a drain centrally positioned in the light reactor. The light reactor should have a depth of less than ten feet.

The light reactor of the present invention can include a first reactor having an inlet and an outlet and a second reactor having an inlet connected to the outlet of the first reactor. The second reactor has an outlet connected to the inlet of the dark reactor. An inflatable cover can be affixed over the light reactor so as to extend thereover.

The dark reactor is a plug flow reactor. The dark reactor has a carbon dioxide inlet in communication therewith so as to deliver carbon dioxide into an interior volume of the dark reactor. The outlet of the dark reactor is positioned at the bottom of the dark reactor.

The present invention is also a process for treating contaminated water. This process comprises the steps of: (1) filtering contaminated water through a first filter so as to remove COD, BOD and TSS therefrom; (2) introducing nutrients and a biomass into an interior volume of a light reactor: (3) passing the filtered contaminated water such that the filtrate containing phosphorus and nitrogen passes into the light reactor; (4) reacting light with the nutrients and the biomass to produce a light-reacted biomass: (5) transferring the light-reacted biomass to a dark reactor; (6) reacting the transferred light-reacted biomass with carbon dioxide in the dark reactor; (7) passing the reacted transferred light-reacted biomass from the dark reactor to a filter; and (8) filtering the passed biomass from the dark reactor so as to remove the algal biomass and to pass filtered water therefrom.

The process of the present invention includes the step of continuously circulating the nutrients and the biomass in the light reactor. The nutrients and the biomass are circulated in a toroidal circulation pattern in the light reactor. This circulation is in a bottom-to-top pattern within the light reactor. The light-reacted biomass is passed through a central drain of the light reactor toward the dark reactor. The velocity of the light-reacted biomass is reduced to less than 2,000 $N_{Re}$ at the dark reactor. The dark reactor has an active culture therein. The active culture can be passed from the dark reactor to the light reactor.

The present invention incorporates the properties of filtering the incoming contaminated water so as to remove the COD, BOD and TSS. The filtrate, containing nitrogen and phosphorus, passes through the membrane biological reactor so as to require further processing. This filtrate is then fed to the high rate algal growth system so as to reduce or eliminate the nitrogen and phosphorus content. The overall algal reactions kinetics is several orders of magnitude (3-10X) greater than the current decomposition kinetics. This innovative and unique process can achieve water quality standards that far exceed current operating results in less than one-tenth the acreage of conventional waste water treatment facilities. The process can be retrofitted to current wastewater or contaminated water systems. The process captures the biogas for conversion into electricity or for flaring. The exhaust (heat and carbon dioxide) of the combustion of the biogas is captured and used to feed the algae and to supply supplemental heat for the process. The algal biomass can be collected and sold as animal feed or as other products.

The present invention incorporates the uniqueness of passing the incoming water through a membrane biological reactor followed by the high rate algal growth system. The algal system is composed of a series of reactors, each having a diameter of greater than eight feet and depth of three feet. This design allows for growth rate exceeding 120 grams/ $m^2$/day, while simultaneously reducing or eliminating the nitrogen or phosphorus contamination. Today, no other technology has been able to incorporate optimal reactor design in order to achieve algal growth.

The present invention incorporates the adaptation of the membrane biological reactor for the removal of COD, BOD and TSS and the generation of biogas ($CH_4$ and $CO_2$). The filtrate stream, containing the nitrogen and phosphorus contaminants, is then fed into the high rate algal growth reactor for remediation. The algal biomass is removed via filtration and collected for reuse. The filtered water meets or exceeds the regulatory requirements for reused water and can be, upon further treatment, converted into potable water. As a result, the present invention is uniquely configured to optimize these remediation and bioreactions to maximize the pollutant removal and to maximize the algal growth while simultaneously minimizing the footprint of the design and reducing the overall installation cost by as much as 80% of that of conventional wastewater treatment systems.

DETAILED DESCRIPTION OF THE INVENTION

Figure 1:
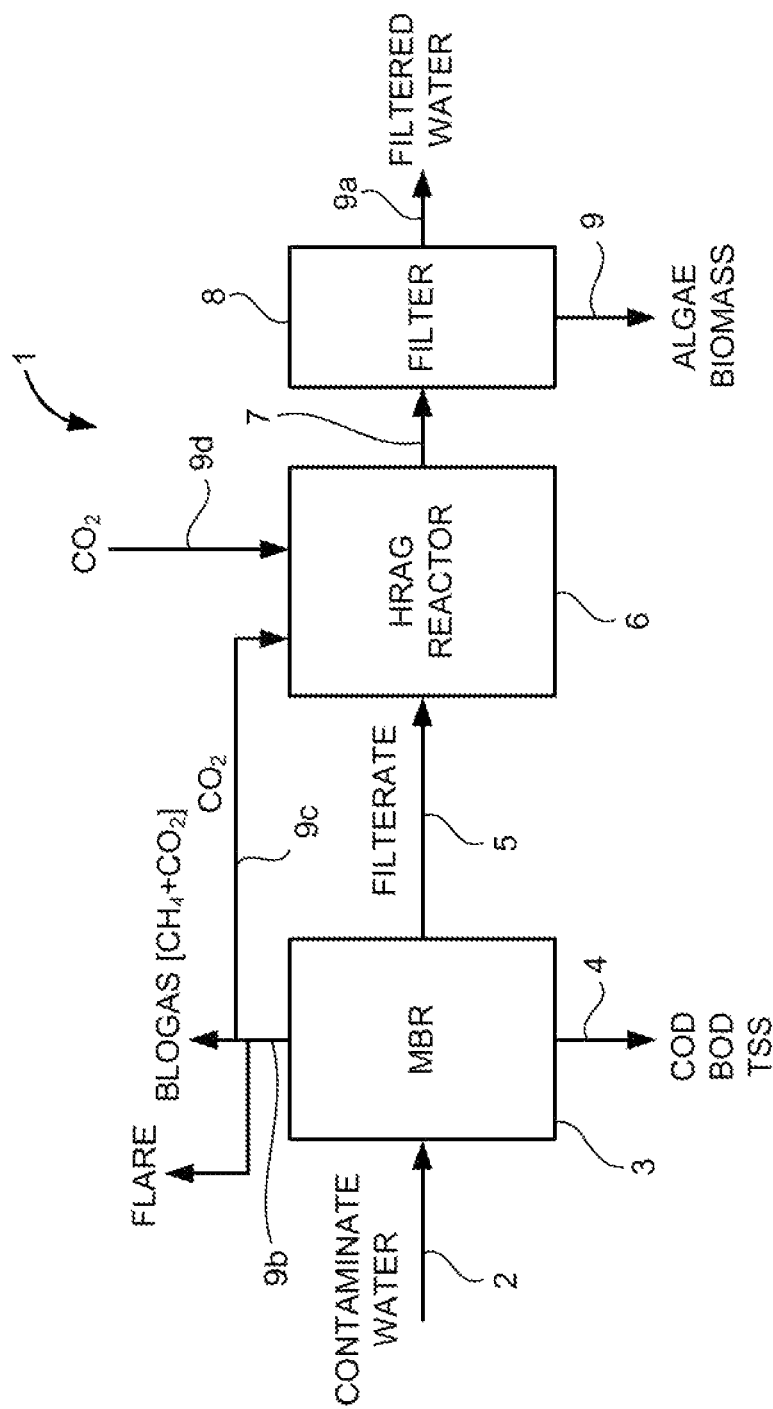
FIG. 1 is a flow diagram showing the process in accordance with the teaching of the preferred embodiment of the present invention.

Referring to FIG. 1, there is shown the process and system 1 for the treatment of contaminated water. In particular, the contaminated water 2 enters the membrane biological reactor 3. The chemical oxygen demand (COD), the biological oxygen demand (BOD) and the total suspended solids (TSS) are shown as discharged through the outlet 4 of the membrane biological reactor. The filtrate 5 then passes from the membrane biological reactor 3 to the high rate algal growth reactor 6. The product of the reaction process in the high rate algal growth reactor 6 is an algal biomass which passes through the outlet 7 to a filter 8. Filter 8 serves to remove the algae through an outlet 9 and to pass filtered water 9a to an outlet thereof.

In FIG. 1, it can be seen that a biogas passes through an outlet 9b from the membrane biological reactor. This biogas can be flared, delivered to another location for energy use, or passed along line 9c to the high rate algal growth reactor 6. Carbon dioxide can be supplied along line 9d to the high rate algal growth reactor 6 so as to facilitate the reaction process in both the light and dark reactors associated with the high rate algal growth reactor 6.

Figure 2:
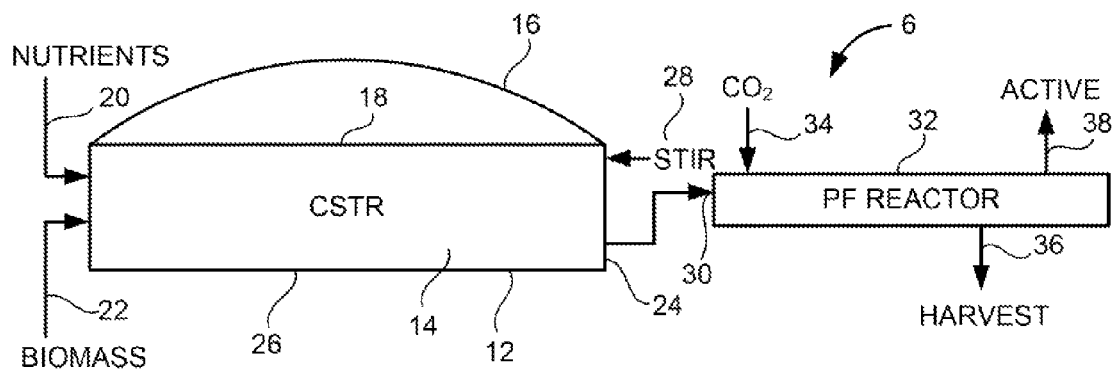
FIG. 2 is a block diagram showing the high rate algal growth system for growing microorganisms in accordance with the teachings of the present invention.

FIG. 2 is a detailed view of the high rate algal growth reactor 6. The high rate algal growth reactor 6 will include a continuously-stirred light tank reactor 12 and a dark plug flow reactor 32. The high rate algal growth system 6 is suitable for the growing of microorganisms and for the removal of phosphorus and nitrogen from the filtrate 5 of the membrane biological reactor 3. As was stated earlier, the membrane biological reactor 3 is extremely successful in removing COD, BOD and TSS. However, the filtrate of the membrane biological reactor 3 will include nitrogen and phosphorus. Fortunately, through the growth of algae in the high rate algal growth reactor 6, such nitrogen and phosphorus are removed by being used to facilitate the growth of algae.

In particular, the reactor 6 can be used for the growth of algae. The reactor 6 includes a continuously stirred tank reactor 12 having an interior volume 14. The continuously stirred tank reactor 12 is a light reactor. In other words, the microorganisms within the interior volume 14 of the continuously stirred tank reactor 12 are exposed to sunlight (or artificial light). There is an inflatable cover 16 that extends over the top 18 of the continuously stirred tank reactor 12. The cover 16 can be transparent so that the light can properly react with the microorganisms in the interior volume 14 of the continuously stirred tank reactor 12.

The continuously stirred tank reactor 12 includes inlets 20 and 22. Inlet 20 is intended to allow the filtrate 5 from the membrane biological reactor 3 to be introduced into the interior volume 14. Inlet 22 can be utilized so that a biomass can be introduced into the interior volume 14. Within the concept of the present invention, a single inlet can be utilized wherein the filtrate 5 and the biomass are mixed prior to being introduced to the interior volume 14. There is an outlet 24 located adjacent to the bottom 26 of the second container 14. Outlet 24 allows the grown microorganisms to be passed from the interior volume 14. A stirring mechanism 28 is cooperative with the interior volume 14 of the continuously stirred tank reactor 12 so as to continuously stir the microorganisms in the interior volume 14. In one embodiment, the stirring mechanism 28 can be an air bubbler cooperative with the microorganisms in the interior volume 14. Alternatively, the stirring mechanism 28 can be a liquid flow through the interior volume of the light reactor. The stirring mechanism 28 should create a toroidal circulation pattern of the microorganisms within the interior volume 14 of the continuously stirred tank reactor 12. Additionally, the stirring mechanism 28 should cause a bottom-to-top circulation pattern in the interior volume thereof.

Within the concept of the present invention, it should be noted that the phosphorus and nitrogen containing filtrate 5 and biomass can be introduced within the interior of the continuously stirred tank reactor 12. As such, the filtrate 5 and biomass can pass by way of a pipe extending into the interior volume 14 so as to be released downwardly into the interior volume 14. Similarly, the outlet 24 can be a pipe that extends into the interior volume 14 toward the center of the continuously stirred tank reactor 12. The outlet 24 can have an end opening within the interior volume 14 generally centrally of the continuously stirred tank reactor 12.

The outlet 24 is connected to the inlet 30 of the dark reactor 32. The dark reactor 32 is a plug flow reactor. Plug flow reactors, such as plug flow reactor 32, are used for chemical reactions in continuous flowing systems. Plug flow reactors are sometimes referred to as continuous tubular reactors. The fluid going through the plug flow reactor 32 flows through the reactor as a series of infinitely thin coherent "plugs", each with a uniform composition, traveling in the axial direction of the reactor, with each plug having a different composition from the ones before and after it. The key assumption is that as a plug flows through the plug flow reactor 32, the fluid is perfectly mixed in the radial direction but not in the axial direction (forwards or backwards). Each plug of differential volume is considered as a separate entity, effectively an infinitesimally small batch reactor, limiting to zero volume. As it flows through the plug flow reactor 32, the residence of the plug is a function of its position in the reactor.

Plug flow reactors are used for the chemical transformation of compounds as they are transported in systems resembling pipes. The "pipe" can represent a variety of engineered or natural conduits through which liquids or gases flow. An ideal plug flow reactor has a fixed residence time. Any fluid (plug) that enters the reactor at time I will exit the reactor at time t plus the residence time.

Referring to FIG. 1, the microorganisms from the continuously stirred tank reactor 12 pass into the inlet 30 of the plug flow reactor 32. The plug flow reactor 32 is maintained in a dark condition. Carbon dioxide 34 is introduced into the plug flow reactor 32 so as to allow the carbon dioxide to feed the microorganisms therein. Ultimately, a harvest 36 is taken from the bottom of the plug flow reactor 32. Any active culture that remains can pass along lines 38 outwardly of the plug flow reactor. As such, the plug flow reactor can operate as part of continuous process.

FIG. 2 shows an alternative embodiment of the system 40 of the present invention. The system 40 includes a first light reactor 42, a second light reactor 44, and a plug flow reactor 46. The first reactor 42 has an inlet 48 and a biomass inlet 50. These inlets 48 and 50 can be separate inlets or they can be as a single combined inlet. The stirring mechanism 52 serves to create the toroidal circulation pattern and the bottom-to-top circulation pattern. The outlet 54 of the first reactor 42 is located centrally of the reactor 42. Outlet 54 will flow through pipe 56 so as to enter the second reactor 44 at inlet 58. The second reactor 44 is also a light reactor configured so as to further treat the microorganisms from the first reactor 42. The second reactor 44 also has an outlet 60 which allows the microorganisms therein to pass along pipe 62 to the inlet 64 of the plug flow reactor 46. Carbon dioxide 66 is mixed with the microorganisms in the plug flow reactor 46. As a result, the harvested microorganisms 68 would be removed from the bottom of the plug flow reactor 46. The active culture 70 can be released from the plug flow reactor so as to pass as an active culture along line 72 to the biomass inlet 50.

Figure 3:
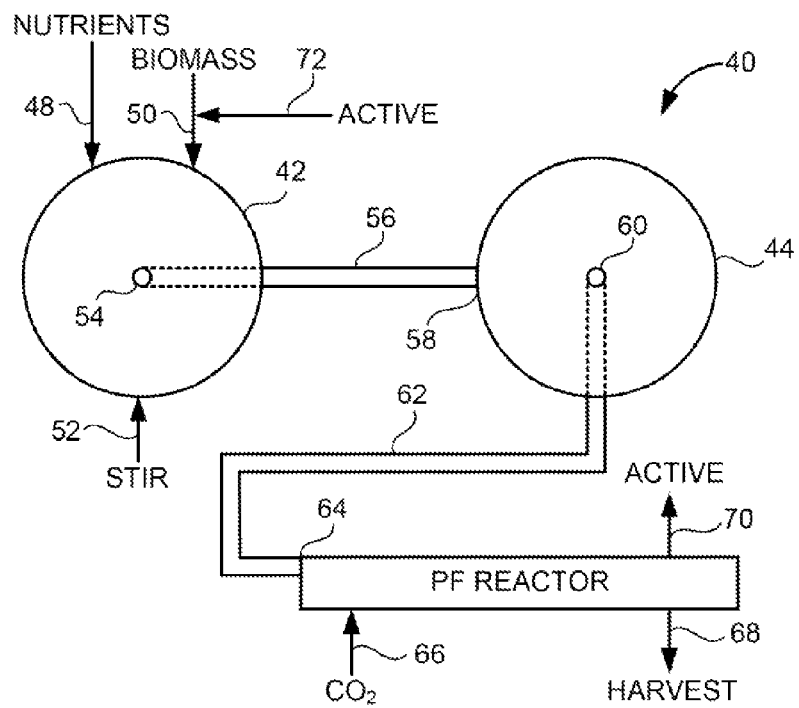
FIG. 3 is a diagrammatic illustration showing the high rate algal growth system for growing microorganisms in accordance with the teachings of the present invention.

FIG. 3 is a side view of the continuously stirred tank reactor 12. The continuously stirred tank reactor 12 has interior volume 14. An inflatable cover 16 extends over the top of the continuously stirred tank reactor 12.

In FIG. 3, it can be seen that the nutrients and biomass are introduced through the inlet 80 which extends through the interior volume 14 generally adjacent to the bottom 26 of the continuously stirred tank reactor 12. Ultimately, the biomass and nutrients are released through the outlet 82 so as to flow upwardly toward the top 18 of the continuously stirred tank reactor 12. As can be seen by arrow 84, the biomass and nutrients flow upwardly in a bottom-to-top pattern. A skimmer 86 can be located adjacent to the top 18 of the continuously stirred tank reactor 12 so as to skim the surface of the microorganisms within the interior volume 14. The stirring mechanism 28 is provided so as to create the proper toroidal circulation pattern within the interior volume 14. The stirring mechanism 28 can be in the form of an air bubbler or a nozzle for creating a liquid flow therein.

The outlet 24 is illustrated as having an opening 90 generally centrally of the interior volume 14. As such, the reacted nutrients and microorganisms of the sunlight can flow outwardly through the outlet 28 toward the dark reactor.

Figure 4:
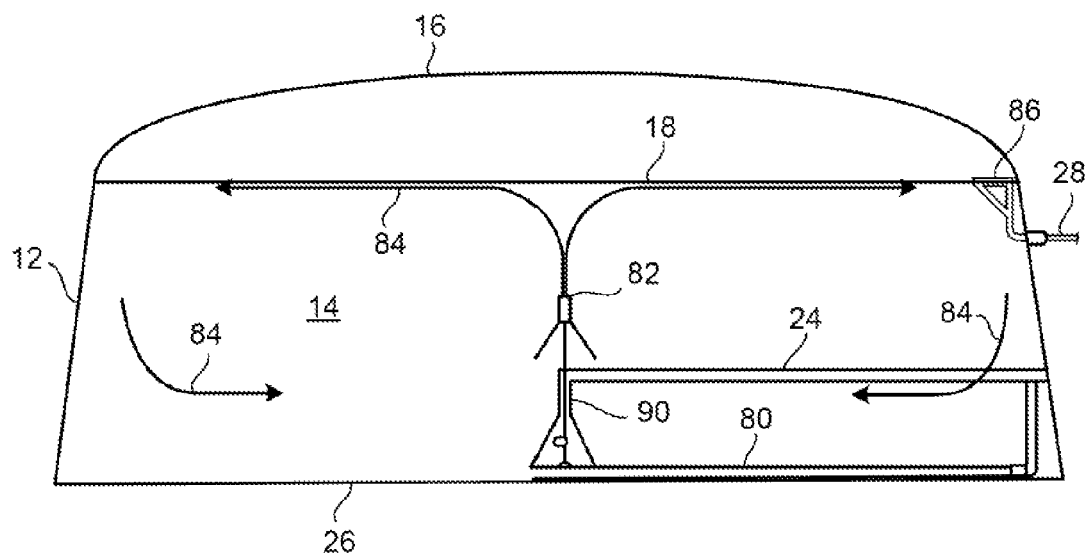
FIG. 4 is a cross-sectional view showing the bottom-to-top circulation pattern of the microorganisms within the light reactor.
Figure 5:
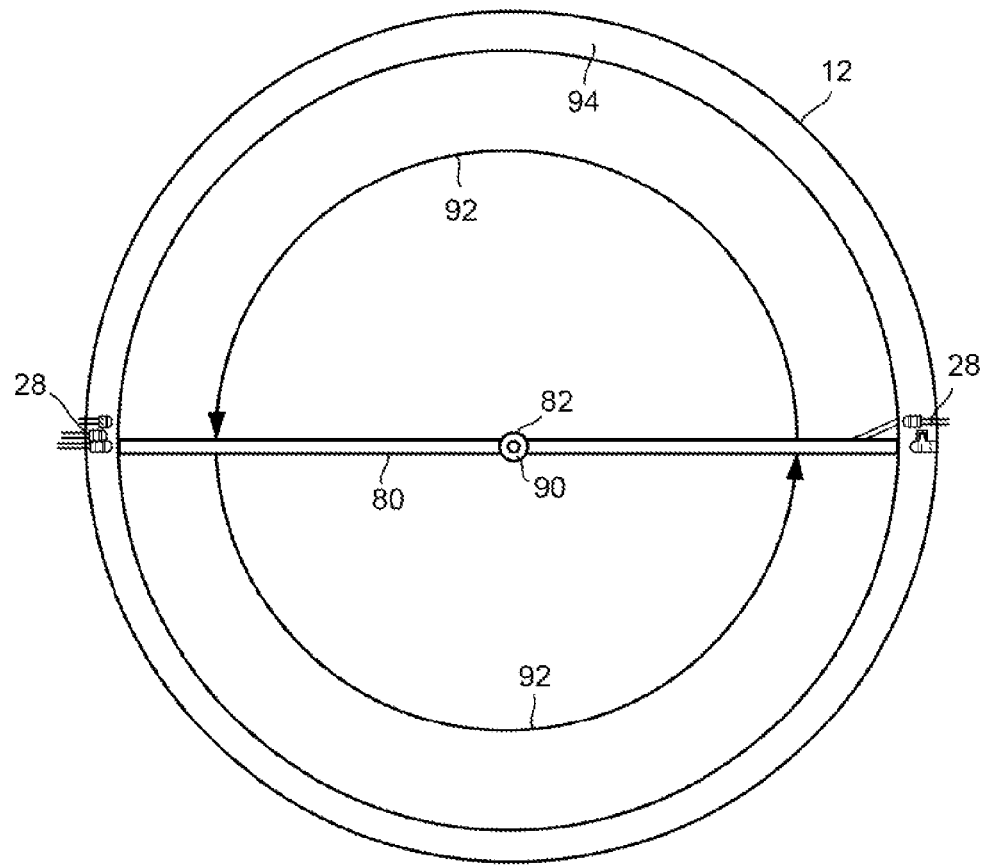
FIG. 5 is a plan view showing the toroidal circulation pattern of the microorganisms within the light reactor.

FIG. 4 illustrates the toroidal circulation pattern (illustrated by arrows 92). In particular, the nutrients are introduced centrally by pipe 80 of the inlet 82. The outlet opening 90 is also positioned centrally of the continuously stirred tank reactor 12. The stirring mechanism 28 is illustrated as located at opposite sides of the continuously stirred tank reactor 12. Various configurations of stirring mechanisms can be incorporated within the concept of the present invention.

In FIG. 4, it can be seen that the continuously stirred tank reactor 12 has a wall 94 extending therearound. The continuously stirred tank reactor 12 will, in the preferred embodiment of the present invention, have a depth of less than ten feet. The walls 94 can be suitably flexible so as to be easily positioned in any desired location with a minimal weight and footprint.

The algae growth system of the present invention incorporates the properties of the photosynthesis reactions known as the "light reaction" and the "dark reaction." The overall reaction rate kinetics is described as oscillating between the zeroth order and first order. The conversion of carbon dioxide into carbohydrates is well understood, but the optimal reactor configuration has not, until now, been determined.

The reaction process for algal growth is known as autocatalytic. This autocatalytic behavior of algal growth is represented by a sequence of events. The events are described below as follows. The overall process of photosynthesis takes place in four stages, including light dependent reactions and dark reactions. The light dependent reactions include stages 1-3 of the autocatalytic behavior of algal growth. Stage 1 is the energy transfer in antenna chlorophyll which takes place in the femtosecond (1 femtosecond (fs)=$10^{-15}$ s) to picosecond (1 picosecond (ps)=$10^{-12}$ s) time scale. Stage 2 is the transfer of electrons in photochemical reactions, which takes place in the picosecond to nanosecond time scale (1 nanosecond (ns)=$10^{-9}$ s). Stage 3 is the electron transport chain and ATP synthesis, which takes place on the microsecond (1 microsecond ($\mu$s)=$10^{-6}$ s) to millisecond (1 millisecond (ms)=$10^{-3}$ s) time scale. The dark reaction (Calvin Cycle) includes stage 4 of the autocatalytic behavior of algal growth. Stage 4 is the carbon fixation and export of stable products and takes place in the millisecond to second time scale. The first three stages occur in the thylakoid membranes.

The present invention incorporates the uniqueness of establishing the first three stages in the "light" continuous stirred tank reactor 12 followed by the "dark" reaction fourth stage in a plug flow reactor 32 to complete the algal growth and carbon dioxide fixation. This configuration allows for growth rates exceeding 120 grams/m$^2$/day. To date, no other technology has been able to incorporate the optimal reactor configuration to algal growth.

The light reactor system may be comprised of one or more light reactors 12 in series to maximize the light absorption. The algal biomass removed via the drain of each light reactor is directed to the successive light reactor 10 or to the dark plug flow reactor 32. The material enters the dark plug flow reactor where the fluid velocity is decreased to achieve an $N_{Re}$ (Reynolds Number) of less than 2000. The algal biomass in the plug flow reactor is deprived of light, but supplied with carbon dioxide as required to maintain the Calvin cycle conversion to sugars. The plug flow reactor is so configured as to allow the algae to settle to the bottom for harvest while maintaining an active culture that is returned to the light reactors.

This reactor configuration will result in algal growth rates exceeding 120 grams/m$^2$/day with solar energy inputs of greater than 120 watts per square meter.

The foregoing disclosure and description of the invention is illustrative and explanatory thereof. Various changes in the details of the described system and method can be made within the scope of the present invention without departing from the true spirit of the invention. The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A process for treating contaminated water, the process comprising:
   filtering the contaminated water through a filter so as to produce a filtrate therefrom;
   introducing nutrients and a biomass into an interior volume of a light reactor from an inlet adjacent to a bottom of said light reactor;
   continuously stirring the nutrients and the biomass in said light reactor;
   passing the filtrate into the light reactor;
   reacting light with the nutrients and the biomass so as to produce a light-reacted biomass;

flowing the light-reacted biomass as a continuous stream to and through a dark plug flow reactor;

directing a flow of carbon dioxide into said plug flow reactor as the continuous stream flows through said dark plug flow reactor;

reacting the flowing light-reacted biomass with carbon dioxide in said dark plug flow reactor so as to produce a reacted biomass; and filtering the reacted biomass from said dark plug flow reactor so as to remove the biomass from said dark plug flow reactor.

2. The process of claim 1, the step of filtering comprising:
removing COD, BOD and TSS from the contaminated water by filtering.

3. The process of claim 1, the step of filtering comprising:
producing a biogas from the contaminated water by filtering; and
passing the biogas to at least one of said light reactor and said dark plug flow reactor.

4. The process of claim 1, the filtrate containing nitrogen and phosphorous.

5. The process of claim 1, the step of continuously stirring comprising:
circulating the nutrients in a toroidal circulation pattern in said light reactor in a bottom-to-top pattern.

6. The process of claim 1, the step of flowing the light-reacted biomass comprising:
reducing a velocity of the continuous stream to less than 2000 $N_{Re}$ in said dark plug flow reactor.

7. The process of claim 1, the step of flowing the light-reacted biomass comprising:
circulating the nutrients and the biomass in the light reactor such that an algal biomass passes to a drain located centrally at a bottom of said light reactor, and
flowing the light-reacted biomass from said drain of said light reactor through an inlet of said dark plug flow reactor.

8. A system for treating contaminated water comprising:
a filter having an inlet and an outlet;
a light reactor having an inlet connected to said outlet of said filter such that a filtrate of said filter flows into said light reactor, said inlet being adjacent to a bottom of said light reactor, said light reactor having an outlet such that a light-reacted product flows outwardly from an interior volume of said light reactor, said outlet being a drain positioned centrally on a bottom of said light-reactor; and a nozzle directed at an acute angle relative to an interior wall of said light reactor so as to flow liquid or air bubbles in a direction toward said interior wall so as to create a toroidal circulation pattern and bottom-to-top circulation pattern of the light-reacted product in said light reactor;

a dark plug flow reactor having an inlet connected to said outlet of said light reactor such that the light-reacted product from said light reactor flows into said dark plug flow reactor, said dark plug flow reactor having an outlet such that a dark-reacted algal biomass passes from said dark plug flow reactor; and a carbon dioxide supply connected by a conduit into an interior volume of said dark plug flow reactor so as to pass carbon dioxide into said dark plug flow reactor.

9. The system of claim 8, the filter being a membrane filter suitable for separating COD, BOD and TSS from the contaminated water and suitable for producing a biogas exhaust therefrom.

10. The system of claim 8, said light reactor comprising:
a first light reactor having an inlet connected to said outlet of said filter such that the filtrate of said filter into said first light reactor, said first light reactor having an outlet; and
a second light reactor having an inlet connected to said outlet of said first light reactor so as to receive the light-reacted product of said first light reactor, said second light reactor having an outlet.

11. The system of claim 8, further comprising:
another filter cooperative with said outlet of said dark plug flow reactor, said another filter suitable for filtering the algal biomass as passed from said outlet of said dark plug flow reactor.

12. The system of claim 8, said light reactor having a biogas outlet, said biogas outlet connected to said dark plug flow reactor such that a biogas from said light reactor flows into an interior volume of said dark plug flow reactor.

* * * * *